Dec. 10, 1968  P. G. SALERNO  3,415,269

MULTIPLE POSITIONED PILOT CONTROLLED POPPET VALVE

Filed Jan. 24, 1967

Inventor:—
Paul G. Salerno,
By [signature] Atty.

United States Patent Office 3,415,269
Patented Dec. 10, 1968

3,415,269
MULTIPLE POSITIONED PILOT CONTROLLED POPPET VALVE
Paul G. Salerno, Glenview, Ill., assignor to Vapor Corporation, Chicago, Ill., a corporation of Delaware
Filed Jan. 24, 1967, Ser. No. 611,447
6 Claims. (Cl. 137—219)

ABSTRACT OF THE DISCLOSURE

A valve assembly having a chamber with poppet valve piston means on the downstream side movable between a closed position, an intermediate open position and a full open position, to control the flow of fluid under pressure through the valve assembly. Selective venting of the chamber controls the position of the poppet valve piston means.

---

Heretofore, various forms of valve assemblies have been provided for controlling the flow of pressurized fluid, such as air, through fluid systems incorporated, for example, in aircraft. Typically, such valve assemblies have included poppet valve piston means which is normally maintained in valve closing position and which is movable to valve opening position when a pressure differential is selectively established on opposite sides thereof. These valve assemblies have not been entirely satisfactory for all applications because they have only two operating positions—a closed position and a full open position. It is an object of my present invention to provide a valve assembly of the general type indicated wherein for greater flexibility of control the poppet valve piston means may be selectively located in an intermediate open position in addition to the conventional closed and full open positions.

Now in order to acquaint those skilled in the art with the manner of constructing and using valve assemblies in accordance with the principles of my present invention, I shall describe in connection with the accompanying drawing, a preferred embodiment of my invention.

Figure 1:
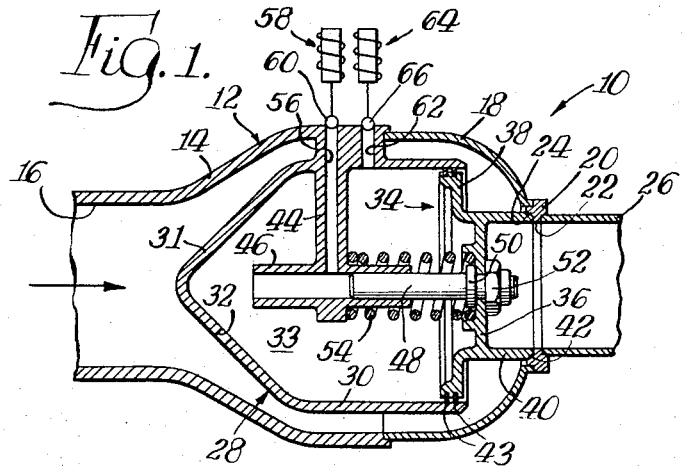
FIGURE 1 is a vertical longitudinal sectional view of the valve assembly of my present invention with the poppet valve piston means being shown in a closed position.

Referring now to FIGURE 1, there is indicated generally by the reference numeral 10 a preferred embodiment of valve assembly incorporating the principles of my present invention. For convenience of discussion, the left-hand end of the valve assembly 10, as viewed in FIGURE 1, will be considered the upstream end, and the right-hand end will be considered the downstream end.

The valve assembly 10 comprises a housing indicated generally by the reference numeral 12, which includes an upstream body section 14 defining an inlet opening 16 and a downstream body section 18 having secured thereto an annular collar 20 that presents an outlet opening 22. The collar 20 on its inboard side is formed with a conical valve seat 24 and on its outboard side is adapted to receive a downstream conduit 26. As will be observed, the inlet and outlet openings 16 and 22 are axially aligned.

Arranged within the housing 12 is valve means indicated generally by the reference numeral 28. The valve means 28 is comprised of a cylinder portion 30, which includes a generally conical end wall 31 having a restricted opening or orifice 32 provided therein, and which defines a piston chamber 33. The end wall 31 faces upstream and serves to minimize resistance to the flow of fluid through the housing 12 about the valve means 28. Axially slidable in the cylinder portion 30 is poppet valve piston means indicated generally by the reference numeral 34. The valve piston means 34 is comprised of a body portion 36, an annular radial flange portion 38 defining an effective piston portion, and a central annular axial extension 40 presenting a conical valve face 42 and defining a valve closure portion. Seated in the outer periphery of the flange portion 38 are a pair of piston rings 43 that frictionally and sealingly engage the inner cylindrical surface of the cylinder portion 30. As will be presently explained, the valve piston means 34 is movable between the closed position shown in FIGURE 1, the intermediate open position shown in FIGURE 2, and the full open position shown in FIGURE 3. In the closed position of the poppet valve piston means 34 (FIGURE 1), the valve face 42 engages the valve seat 24 to prevent the flow of fluid from the housing 12 through the outlet opening 22.

Wall means 44 extends between the housing 12 and the cylinder portion 30 and projects radially into the latter. Disposed at the inner end of the wall means 44 is a tubular member 46 which is located centrally of the cylinder portion 30 coaxially of the inlet and outlet openings 16 and 22. For convenience and economy in manufacture and assembly, the housing body section 14, the cylinder portion 30, the wall means 44 and the tubular member 46 may be formed integrally as illustrated. Slidably guided in the tubular member 46 is a rod member 48 which is formed with a flange portion 50. The body portion 36 of the valve piston means 34 is secured by means of a nut 52 on the rod member 48 in abutment with the flange portion 50. Spring means in the form of a compression spring 54 is located intermediate of the wall means 44 and the body portion 36 of the valve piston means 34 concentrically of the rod member 48. The spring 54 normally biases the valve piston means 34 to the right to dispose the valve face 42 into engagement with the valve seat 24 (FIGURE 1), while the flange portion 50 of the rod member 48 is engageable with the adjacent end of the tubular member 46 (FIGURE 3) to limit inward movement of the valve piston means 34 and to establish the full open position of the latter.

A first fluid passageway 56 is formed in the wall means 44 and normally communicates, as shown in FIGURE 1, at the inner end thereof with the interior of the cylinder portion 30 through the bore of the tubular member 46. Solenoid operated valve means, indicated schematically at 58 and having a valve element 60, is provided for selectively opening and closing the outer end of the first fluid passageway 56 to the atmosphere. A second fluid passageway 62 is formed in the wall means 44 and communicates at the inner end thereof directly with the interior of the cylinder portion 30. Solenoid operated valve means, indicated schematically at 64 and having a valve element 66, is provided for selectively opening and closing the outer end of the second fluid passageway 62 to the atmosphere. The first fluid passageway 56 and the solenoid operated valve means 58 constitute first means for selectively opening the interior of the cylinder portion 30 to the atmosphere; the rod member 48 serves as second means for rendering the first means ineffective by closing off the inner end of the passageway 56 when the valve piston means 34 is moved to the intermediate open position shown in FIGURE 2; and the second fluid passageway 62 and the solenoid operated valve means 64 constitute third means, which is independent of the first and second means, for selectively opening the interior of the cylinder portion 30 to the atmosphere.

The above-described valve assembly of my present invention is adapted to be used in controlling the flow of pressurized fluid, such as air, through various fluid systems incorporated, for example, in aircraft. The valve assembly may be interposed in duct work with the housing body section 14 secured to an upstream duct connected to a source of air under pressure, and with the collar 20 secured to the downstream conduit 26 leading to a location where air under pressure is to be selectively delivered. Fluid under pressure entering the inlet opening 16 flows around the valve means 28 and through the orifice 32 into the interior of the cylinder portion 30. When the solenoid operated valve means 58 and 64 are maintained deenergized, the valve elements 60 and 66 are disposed to close the fluid passageways 56 and 62 to the atmosphere. In this condition of operation, the pressure of fluid within the cylinder portion 30, which is equal to the pressure of the fluid at the inlet opening 16 by reason of the interconnecting orifice 32, acts with the spring 54 to maintain the valve piston means 34 in a closed position (FIGURE 1) with the valve face 42 engaging the valve seat 24.

When restricted flow of fluid between the inlet and outlet openings 16 and 22 is desired, the solenoid operated valve means 58 is energized for unseating the valve element 60 from the outer end of the first fluid passageway 56. The piston chamber 33 is thereby opened to the atmosphere through the bore of the tubular member 46 and the passageway 56. As a result, the pressure within the piston chamber 33 is greatly reduced, since the rate of flow of fluid under pressure through the orifice 32 is small relative to the rate of flow of fluid from the piston chamber 33 through the passageway 56 to the atmosphere. A pressure differential is thus established on opposite sides of the poppet valve piston means 34. The initial opening force acting on the valve piston means 34 is approximately equal to the difference in area between the inside diameter of the cylinder portion 30 and the outside diameter of the axial extension 40, times the pressure of the fluid within the housing 12, less the relatively small force exerted by the spring 54. As the valve piston means 34 starts to move inwardly of the cylinder portion 30 under the influence of the opening force exerted against the effective piston portion 38, the valve face 42 is disengaged from the valve seat 24 thereby permitting flow of fluid from the housing 12 through the outlet opening 22 to the downstream conduit 26. After the valve piston means 34 has initially opened, the opening force acting thereon increases rapidly to a value essentially equal to the pressure of the fluid in the downstream conduit 26 times the entire area of the inside diameter of the cylinder portion 30, since the downstream conduit pressure is increasing to a value substantially equal to the upstream duct pressure, while the pressure prevailing in the piston chamber 33 remains practically equal to atmospheric pressure.

Figure 2:
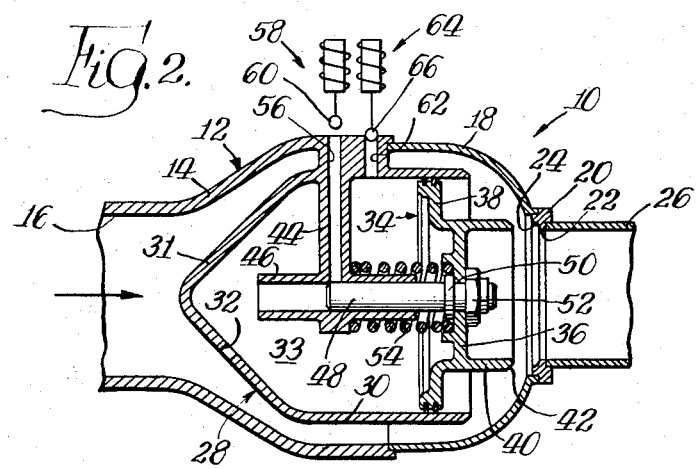
FIGURE 2 is a vertical longitudinal sectional view corresponding generally to FIGURE 1, but with the poppet valve piston means being shown in an intermediate open position.
Figure 3:
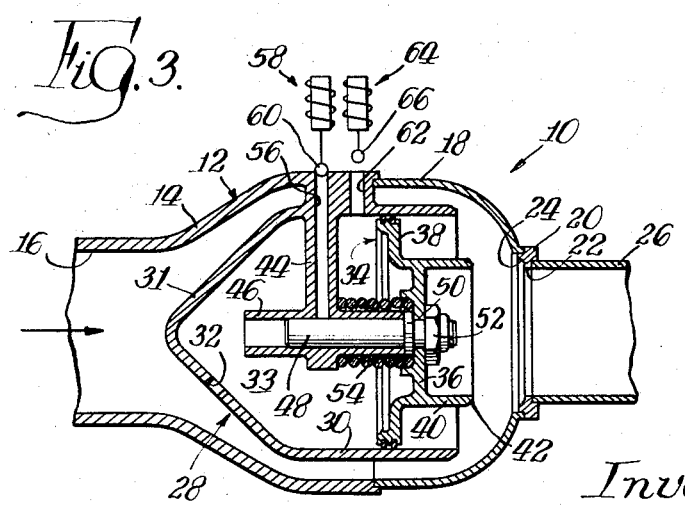
FIGURE 3 is a vertical longitudinal sectional view corresponding generally to FIGURE 1, but with the poppet valve piston means being shown in a full open position.

As the poppet valve piston means 34 approaches the intermediate open position shown in FIGURE 2, the rod member 48 closes off the inner end of the first fluid passageway 56 and thus interrupts communication between the piston chamber 33 and the atmosphere. At this point, fluid under pressure flowing through the orifice 32 builds up the pressure within the piston chamber 33 to prevent the valve piston means 34 from opening further.

When unrestricted flow of fluid between the inlet and outlet openings 16 and 22 is desired, the solenoid operated valve means 64 is energized for unseating the valve element 66 from the outer end of the second fluid passageway 62. The piston chamber 33 is again opened to the atmosphere, the pressure within the piston chamber 33 is thereby greatly reduced, and the pressure of the fluid flowing through the housing 12 acts on the poppet valve piston means 34 to move the same inwardly of the cylinder portion 30 to the full open position shown in FIGURE 3. The poppet valve piston means 34 may be closed by deenergizing the solenoid operated valve means 64 to seat the valve element 66 against the outer end of the passageway 62 whereby to close the piston chamber 33 to the atmosphere. With both passageways 56 and 62 closed, fluid under pressure flowing through the orifice 32 builds up the pressure within the piston chamber 33, and such pressure assisted by the spring 54 returns the poppet valve piston means 34 to the closed position shown in FIGURE 1. If desired, the piston chamber 33 may be vented to a downstream point in the fluid system rather than to the atmosphere as disclosed herein.

While I have shown and described what I believe to be a preferred embodiment of my present invention, it will be understood by those skilled in the art that various rearrangements and modifications may be made therein without departing from the spirit and scope of my invention.

I claim:

1. A valve assembly comprising a housing having inlet and outlet openings, a valve seat at said outlet opening, valve means within said housing including a cylinder portion and poppet valve piston means slidable in said cylinder portion between a closed position and an intermediate open position and a full open position, bleed passage means for communicating the interior of said cylinder to inlet pressure said valve piston means having an effective piston portion and a valve closure portion, said valve closure portion in said closed position of said valve piston means engaging said valve seat to prevent flow of fluid from said housing through said outlet opening, first means for selectively opening the interior of said cylinder portion to the atmosphere to reduce the pressure of fluid therein whereupon the pressure of fluid within said housing exteriorly of said valve means exerts a force against said effective piston portion causing said valve piston means to move inwardly of said cylinder portion whereby said valve closure portion is disengaged from said valve seat to permit flow of fluid through said outlet opening, second means for rendering said first means ineffective when said valve piston means is moved to said intermediate open position, and third means independent of said first and second means for selectively opening said interior of said cylinder portion to the atmosphere to reduce the pressure of fluid therein whereupon the pressure of fluid within said housing exteriorly of said valve means exerts a force against said valve piston means causing the latter to move inwardly of said cylinder portion to said full open position.

2. The valve assembly of claim 1 wherein said valve piston means is comprised of a body portion, an annular radial flange portion defining said effective piston portion, and a central axial extension presenting a valve face engageable with said valve seat and defining said valve closure portion.

3. The valve assembly of claim 1 including wall means extending between said housing and said cylinder portion; wherein said first means includes first fluid passageway means in said wall means communicating at the inner end thereof with the interior of said cylinder portion, and means for selectively opening and closing the outer end of said first fluid passageway means to the atmosphere; wherein said second means includes an element movable with said valve piston means for interrupting communication between said first fluid passageway means and the interior of said cylinder portion when said valve piston means is moved to said intermediate open position; and wherein said third means includes second fluid passageway means in said wall means communicating at the inner end thereof with the interior of said cylinder portion, and means for selectively opening and closing the outer end of said second passageway means to the atmosphere.

4. The valve assembly of claim 1 wherein said inlet and outlet openings are axially aligned; including wall means extending between said housing and said cylinder portion and projecting radially into the latter, and a tubular member at the end of said wall means within said cylinder portion co-axially of said inlet and outlet openings; wherein said first means includes first fluid passageway means in said wall communicating at the inner end thereof with the interior of said cylinder portion through said tubular member, and means for selectively opening and closing the outer end of said first fluid passageway means to the atmosphere; wherein said second means includes a rod member secured to and movable with said valve piston means for interrupting communication between said first fluid passageway means and the interior of said cylinder portion when said valve piston means is moved to said intermediate open position; and wherein said third means includes second fluid passageway means in said wall means communicating at the inner end thereof with the interior of said cylinder portion, and means for selectively opening and closing the outer end of said second fluid passageway means to the atmosphere.

5. The valve assembly of claim 4 wherein said valve piston means is comprised of a body portion, an annular radial flange portion defining said effective piston portion, and a central axial extension presenting a valve face engageable with said valve seat and defining said valve closure portion.

6. The valve assembly of claim 5 including spring means normally biasing said valve closure portion into engagement with said valve seat, and said spring means being located intermediate of said wall means and said valve piston means concentrically of said rod member.

References Cited
UNITED STATES PATENTS

| | | | |
|---|---|---|---|
| 1,727,517 | 9/1929 | Moody | 137—219 |
| 1,824,916 | 9/1931 | Moody | 137—219 |
| 3,076,471 | 2/1963 | Salerno | 251—35 XR |

HAROLD W. WEAKLEY, *Primary Examiner.*

U.S. Cl. X.R.

251—35, 44